(12) United States Patent
Liu

(10) Patent No.: US 8,914,821 B2
(45) Date of Patent: Dec. 16, 2014

(54) ELECTRONICALLY CLIPPING COUPONS

(75) Inventor: Jianju Liu, Kentfield, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 117 days.

(21) Appl. No.: 13/187,865

(22) Filed: Jul. 21, 2011

(65) Prior Publication Data

US 2013/0024881 A1 Jan. 24, 2013

(51) Int. Cl.
| | |
|---|---|
| H04N 7/16 | (2011.01) |
| G06Q 30/02 | (2012.01) |
| H04N 21/4784 | (2011.01) |
| H04N 21/81 | (2011.01) |
| G06Q 30/00 | (2012.01) |

(52) U.S. Cl.
CPC ........... *H04N 21/4784* (2013.01); *G06Q 30/02* (2013.01); *G06Q 30/0207* (2013.01); *H04N 21/812* (2013.01)
USPC .......................... 725/23; 705/14.1; 705/14.39

(58) Field of Classification Search
None
See application file for complete search history.

(56) References Cited

U.S. PATENT DOCUMENTS

| | | | | |
|---|---|---|---|---|
| 6,539,302 | B1* | 3/2003 | Bender et al. ................. | 701/533 |
| 7,302,696 | B1 | 11/2007 | Yamamoto | |
| 7,706,838 | B2 | 4/2010 | Atsmon | |
| 2002/0178060 | A1* | 11/2002 | Sheehan ........................ | 705/14 |
| 2003/0056103 | A1 | 3/2003 | Levy | |
| 2004/0177003 | A1 | 9/2004 | Liao | |
| 2005/0251683 | A1 | 11/2005 | Levy | |
| 2008/0072262 | A1* | 3/2008 | Dimkovic ....................... | 725/62 |
| 2008/0097844 | A1 | 4/2008 | Hsu et al. | |
| 2008/0140520 | A1* | 6/2008 | Hyder et al. .................... | 705/14 |
| 2008/0235278 | A1 | 9/2008 | Piepenbrink | |
| 2008/0243623 | A1 | 10/2008 | Redford | |
| 2008/0244635 | A1* | 10/2008 | Pollard et al. .................. | 725/23 |
| 2008/0288600 | A1 | 11/2008 | Clark | |
| 2008/0290987 | A1 | 11/2008 | Li | |
| 2008/0300984 | A1 | 12/2008 | Li | |
| 2008/0301746 | A1 | 12/2008 | Wiser | |
| 2009/0089158 | A1 | 4/2009 | Noll | |
| 2009/0265163 | A1 | 10/2009 | Li | |
| 2009/0265236 | A1 | 10/2009 | Schultz | |
| 2009/0300668 | A1 | 12/2009 | Campagna | |
| 2009/0300695 | A1 | 12/2009 | White | |
| 2009/0317053 | A1 | 12/2009 | Morley | |

(Continued)

FOREIGN PATENT DOCUMENTS

WO 01/82201 A2 11/2001

OTHER PUBLICATIONS

European Search Report—EP 12174967—Mailing date: Oct. 4, 2012.

*Primary Examiner* — Chris Parry
(74) *Attorney, Agent, or Firm* — Banner & Witcoff, Ltd.

(57) ABSTRACT

Methods, systems, computer readable media, and apparatuses for electronically clipping coupons are presented. In one aspect, a user request to electronically clip a vendor coupon may be received at a user device, where the vendor may be different from a supplier of the content. Account information associated with the user may be identified. Thereafter, information identifying the electronically clipped coupon and the account information may be transmitted to the vendor. The vendor subsequently may allow the user to redeem the clipped coupon the next time that the user visits the vendor and presents matching account information to the vendor.

28 Claims, 8 Drawing Sheets

(56) References Cited

U.S. PATENT DOCUMENTS

| | | |
|---|---|---|
| 2010/0023965 A1 | 1/2010 | Malik |
| 2010/0031162 A1 | 2/2010 | Wiser |
| 2010/0057887 A1 | 3/2010 | Wang |
| 2010/0063857 A1 | 3/2010 | Malik |
| 2010/0098075 A1 | 4/2010 | Kokernak |
| 2010/0100449 A1 | 4/2010 | Broberg |
| 2010/0285820 A1* | 11/2010 | Jozwiak et al. ............... 455/466 |
| 2010/0318407 A1* | 12/2010 | Leff et al. ...................... 705/10 |
| 2012/0066047 A1* | 3/2012 | Muthugopalakrishnan et al. ........................ 705/14.26 |

* cited by examiner

ELECTRONICALLY CLIPPING COUPONS

BACKGROUND

Commonly, many consumers search for and collect coupons in hopes of saving money on a variety of goods and services, and many businesses create such coupons in hopes of increasing business and revenues. In the past, the coupons created by businesses and collected by consumers were often pieces of paper circulated by mail and other physical distribution methods. This disclosure provides more convenient, functional, and usable ways of creating, distributing, clipping, and/or redeeming coupons.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to electronically clipping and using coupons. According to one or more aspects, a user request to electronically clip a vendor coupon may be received at a user device, and the vendor may different from a supplier of the content. Subsequently, account information used by the user to pay for content may be identified. Thereafter, information identifying the electronically clipped coupon and the account information may be transmitted to the vendor. The vendor subsequently may allow the user to redeem the clipped coupon the next time that the user visits the vendor and presents matching account information to the vendor (e.g., a credit card number, debit card number, gift card number, etc. that matches the payment account information previously received by the vendor).

According to one or more additional aspects, one or more additional coupons for a second business may be automatically clipped based on the second business's geographic proximity to the first business and/or based on whether the second business is along a travel route between the user's location and the first business.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
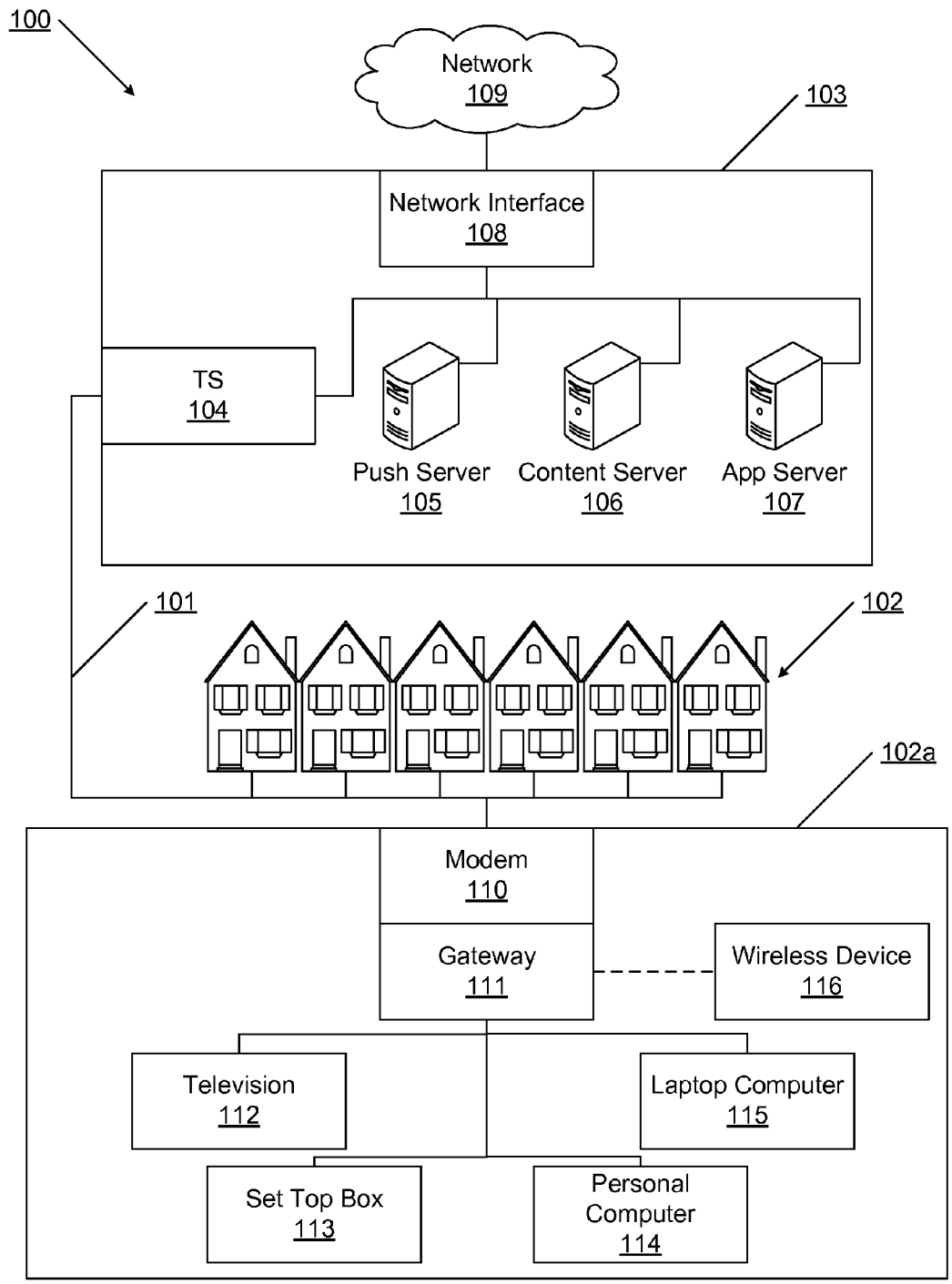
FIG. 1 illustrates an example information distribution network according to one or more aspects described herein.

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for electronically clipping coupons.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
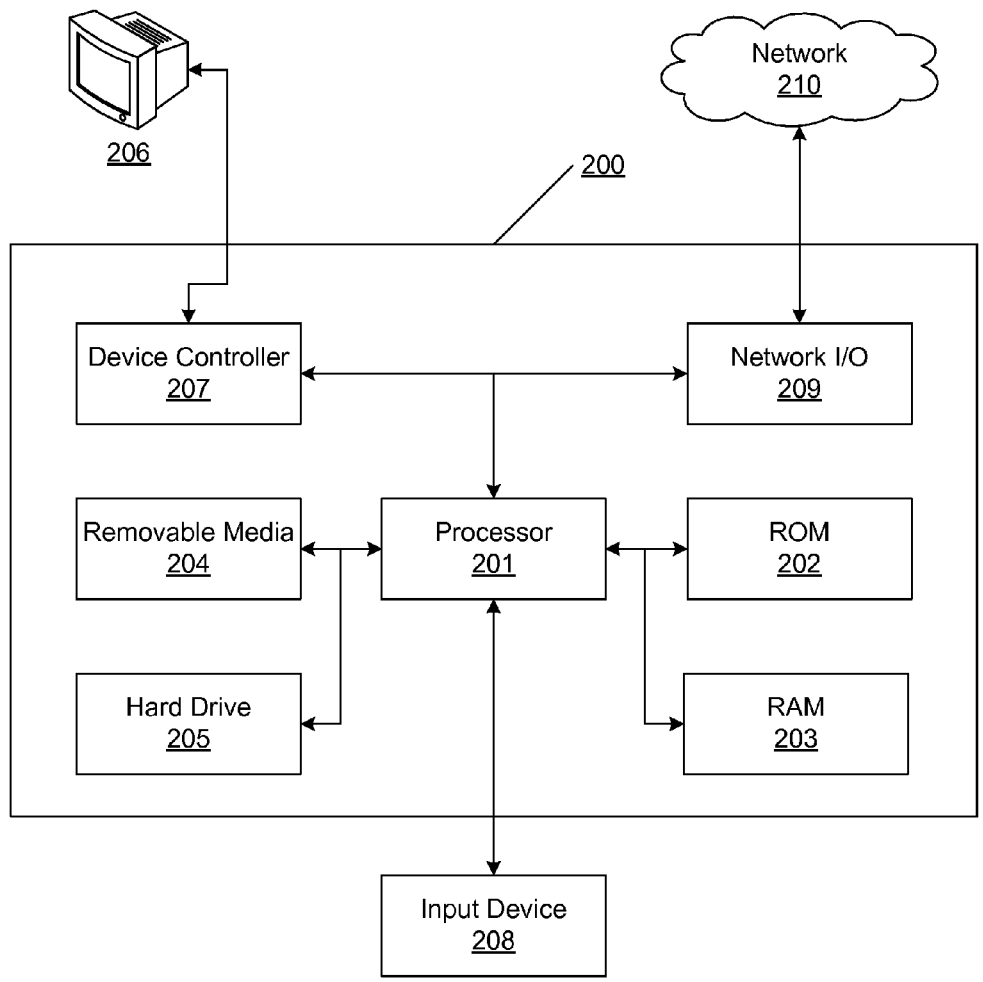
FIG. 2 illustrates an example hardware platform on which the various elements described herein may be implemented according to one or more aspects described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein may enable coupons to be electronically clipped, for example, by users accessing content from the central office 103. For instance, one such user may be a viewer who is watching a television program being transmitted from the central office 103 or any content provider. Particular aspects of the disclosure may relate to transmissions between a central office 103 and one or more gateways 111. These and other aspects of the disclosure will be described in detail below.

Figure 3:
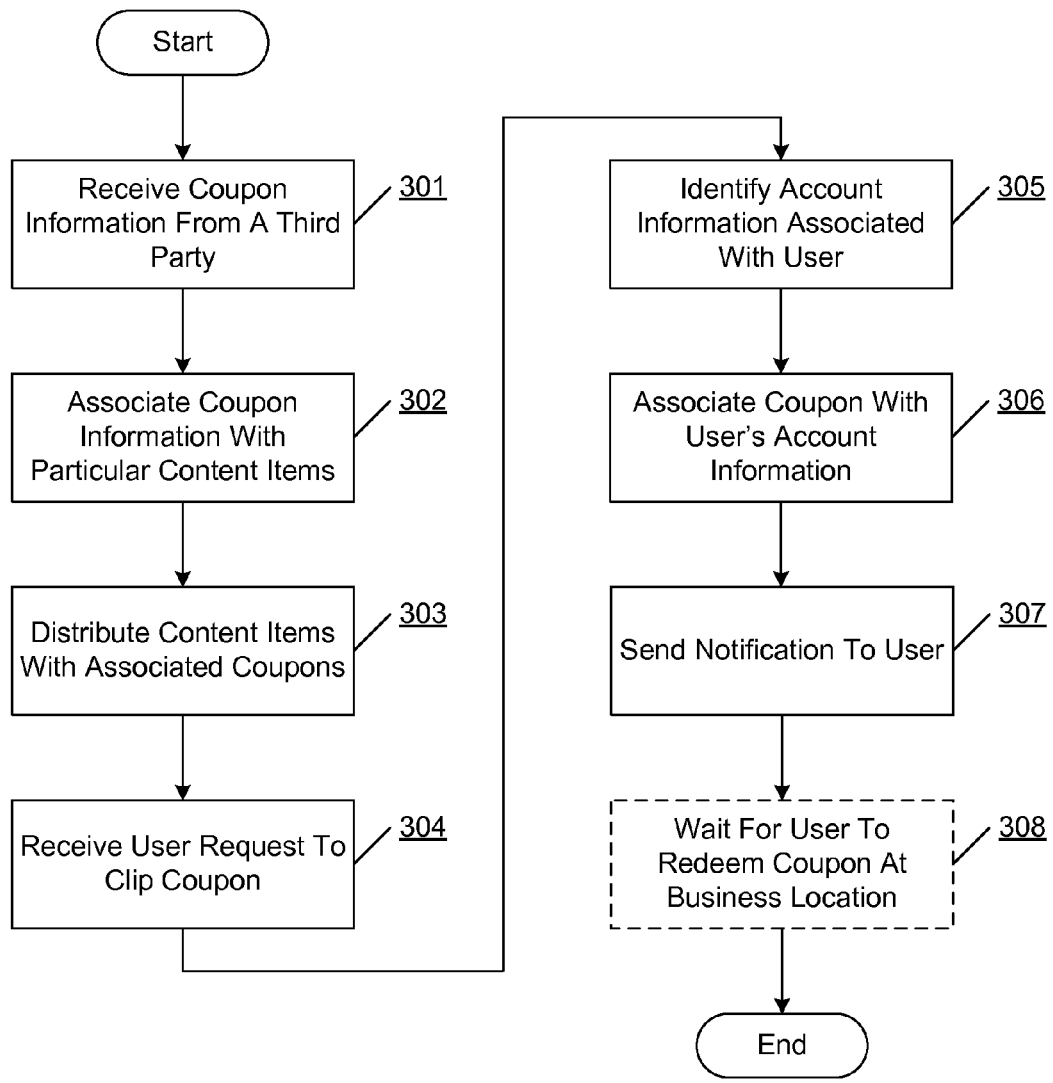
FIG. 3 illustrates an example method of electronically clipping coupons according to one or more aspects described herein.

FIG. 3 illustrates an example method of electronically clipping coupons according to one or more aspects described herein. As used herein, electronically clipping coupons may include electronically receiving, capturing, obtaining, choosing, selecting, downloading, and/or storing information describing one or more discounts, deals, offers, specials, prices and/or the like to be applied to purchases of and/or redeemed with respect to transactions involving one or more goods and/or services. In one or more arrangements, any and/or all of the example methods described herein may be performed by a computing device, such as computing device 200 or gateway interface device 111 operating alone or in combination with one or more other devices (e.g., display 206, television 112, etc.).

In step 301, information about one or more coupons may be received at a service or content provider, e.g., at a computing device, such as an application server 107, from at least one third party, such as an advertiser or a business. Additionally or alternatively, the coupons may also be generated by the service or content provider. For instance, in step 301, a service provider may receive coupon information from a retailer. The coupon information may be received electronically, for example, at central office 103 (e.g., by application server 107) from a computing device associated with the retailer. In this example and throughout this disclosure, references to the service provider (or any other entity) receiving, sending, and/or processing information and/or performing other actions may correspond to one or more computing devices and/or systems (e.g., electronic devices equipped with one or more processors communicatively coupled to one or more memories) associated with the service provider (or other entity) receiving, sending, and/or processing such information and/or performing such other actions.

In one or more arrangements, the coupon information may define details of any desired promotion or offer that a retailer or other business or entity wishes to provide to consumers. For example, the retailer may wish to offer a discount on the purchase of certain items, and thus the coupon information may identify those items and the type and/or amount of the discount. The retailer also might wish to limit the offer to certain individuals, for instance, and the coupon information accordingly may include information identifying individuals (or groups of individuals) who are eligible to redeem the coupon. In addition, the retailer may wish to limit the offer to certain establishments, and thus the coupon information may identify establishments (e.g., store numbers, franchises, etc.) that are permitted to accept the coupon. The retailer also may wish to place other conditions and restrictions on the use of the coupon, and these other conditions or restrictions thus may be identified by the coupon information. Example conditions and restrictions may include requiring qualifying purchase of other items, a total purchase dollar amount, a time of day restriction, a calendar date restriction, a restriction on the number of uses (e.g., mandating that a coupon is single-use only), a location restriction, and/or any other desired type of restriction. Other example conditions and restrictions may include even more specific limitations on the particular products and/or services for which the coupon or coupons may be redeemed (e.g., based on model numbers, serial numbers, Universal Product Code (UPC) numbers, Stock-Keeping Unit (SKU) numbers, quick response (QR) codes, etc.).

In at least one arrangement, each coupon (e.g., each promotion, offer, etc.) defined by the coupon information may be assigned a unique identifier by the service provider when the coupon is created (e.g., when the coupon information is received). In addition, the service provider may track and store activity information for each coupon, and the activity information may indicate, for example, how many times a particular coupon has been clipped, how many times the particular coupon has been redeemed, how many users have clipped the particular coupon, which users have clipped the particular coupon, which users have redeemed the particular coupon, at which locations the particular coupon has been redeemed, and/or the like. This activity information may, for instance, be tracked and/or stored by the service provider with respect to a particular coupon for the lifetime of the particular coupon.

Additionally or alternatively, each product and/or service that is related to a particular coupon (e.g., each product and/or service to which a particular coupon may be applied when such product and/or service is purchased) also may be assigned a unique identifier by the service provider when a corresponding coupon is created (e.g., when the coupon information is received). In at least one arrangement, the unique identifier assigned to a particular product and/or service by the service provider may correspond to a Universal Product Code (UPC), Stock-Keeping Unit (SKU), European Article Number (EAN), QR code, and/or the like that is or are associated with the product or service (e.g., a string of numbers and/or letters, such as "012345678912" or "US-098765-A-4321"). In some instances, the service provider also may categorize one or more products and/or services for which coupons so as to facilitate the offering of such coupons to users. For example, the service provider may categorize and/or group coupons for different hair salons into a "hair salon" category, and the service provider may categorize and/or group coupons for different types of laundry detergent into a "laundry detergent" category. Other desired categories, such as entertainment-related categories, of any desired degree of specificity may also be defined and used.

In one or more arrangements, the service provider further may assign a unique identifier to each entity (e.g., retailer, business, etc.) for which the service provider distributes coupons. The service provider may assign such unique identifiers (e.g., strings of numbers and/or letters, such as "0987654321" or "RT-1029-384756-A") to each of such entities when the service provider receives the coupon information, and/or the service provider may assign such unique identifiers when each entity first enrolls in an electronic coupon program offered by the service provider. Having assigned unique identifiers to such entities, the service provider may track and store, for instance, records relating to which coupons correspond to which entities, how many coupons have been clipped for each entity, how many coupons have been redeemed for each entity, and/or the like. In some instances, after an entity enrolls in an electronic coupon offered by the service provider, the service provider may, for instance, provide the entity with hardware equipment (e.g., one or more point of sale terminals) and/or software to facilitate redemption of coupons clipped through the service provider's electronic coupon program. In instances where a coupon is created by a first entity (e.g., a device or product manufacturer manufacturer) but redeemed with a second entity (e.g., a retailer), the service provider may require the first entity to specify a payment method to handle settlement of the redeemed coupons. For example, in processing coupons and applying discounts in such a situation, the service provider may reimburse the second entity at which the coupons are redeemed (e.g., a grocery store) and subsequently request a corresponding payment from the first entity which created the coupons (e.g., a manufacturer). In some cases, the first entity and the second entity may make arrangements for reimbursement that might not involve the service provider. In other cases, when the service provider is processing coupons, the service provider may request approval (e.g., on a redemption-by-redemption basis) from the first entity (e.g., the manufacturer) before allowing and/or approving redemption of a coupon at the second entity (e.g., the store or retailer).

According to one or more aspects, the coupon information may define one or more particular coupons and/or may identify which coupon or coupons should be offered with particular content items (e.g., linear content items, on-demand content items, particular television programs, news programs, advertisements, channels, applications, etc.) and/or particular applications, such as interactive applications. Additionally or alternatively, the coupon information may identify when the coupon or coupons should be offered to consumers (e.g., what time of day, within what range of dates, etc.).

For example, the service provider may receive coupon information from an electronics store, and this coupon information may define a coupon that can be redeemed at the electronics store to obtain a ten-percent discount on a video game sold by the electronics store. In addition, the coupon information may specify that the coupon should be offered (e.g., displayed or otherwise transmitted to one or more viewers, such as the user of gateway 111) whenever a commercial for the electronics store is transmitted between 8 p.m. and 11 p.m. In this example, the coupon information may further specify that the coupon should be offered for a limited time period (e.g., five days) and/or until a particular date (e.g., August 22).

In step 302 of the method illustrated in FIG. 3, the coupon information may be associated with one or more particular content items that the service provider offers, so that the coupons can be delivered or offered to users who request the associated content items. For example, in associating the coupon information with one or more particular content items (e.g., televisions shows, advertisements, applications, data, etc.), the service provider may identify the particular content items that will include a particular coupon, and then store information (e.g., in a database) indicating particular coupon should be included with or otherwise associated with the particular content items when such content items are processed, stored, or transmitted. This associating may be performed by one or more devices at central office 103 (e.g., by application server 107), and in at least one arrangement, this associating may be based on specifications included in the coupon information (e.g., the coupon information may specify that a particular coupon is to be associated with a particular television show, advertisement, or other content item).

For instance, with reference to an example involving an electronics store, the coupon information may specify that the coupon should be offered concurrently with commercials for the electronics store. Thus, the application server 107 may update a database or data store where programming configuration details are stored so that when commercials for the electronics store are transmitted or displayed, the electronics store's coupon is offered or presented. The configuration details in this example database may include the names of programs, their scheduled start and/or end times, their corresponding genres, and/or the like. After such a database is updated (e.g., by application server 107), the configuration details for a program that includes one or more coupons may further include information identifying the coupons to be offered when the program is transmitted (e.g., a unique identifier for the coupon or coupons to be offered).

Figure 5:
FIG. 5 illustrates an example user interface that includes an offer for an electronic coupon according to one or more aspects described herein.

In step 303, the content items may be distributed with the associated coupons. For example, the service provider may transmit the content items (e.g., from central office 103 to various wireless devices or homes 102 via the network of lines 101) to a plurality of users (e.g., users) as part of a unicast transmission (e.g., a video on demand transmission), a multicast transmission, broadcast transmission, etc. In the example above involving the electronics store, for instance, the service provider may transmit linear television content, and when a commercial for the electronics store is displayed, the service provider may cause the coupon for the electronics store to be offered to the viewers receiving the content. For example, the service provider may embed the coupon/offer in one or more data packets transmitted to the viewers (e.g., by embedding the data packets in an MPEG transport stream transmitted to the viewers concurrently with a piece of content, or in advance of a scheduled transmission time, etc.). Subsequently, as the user is viewing the content, the coupon may be presented to the user. For example, the user's device (e.g., gateway 111) may generate an overlay message indicating to the user that a related coupon is available for clipping. FIG. 5, which is further described below, illustrates an example display of such an overlay message.

In step 304, a user request to "clip" or receive a coupon may be received. In one or more arrangements, the user's request to clip the coupon may be received at a device at the user's location (e.g., gateway 111), which then may relay the request to a device at a location of the service provider (e.g., central office 103 and/or application server 107). As further described below, the user's request to clip the coupon may be received via a user interface associated with a device (e.g., gateway 111) and/or as user input received by such a device. For example, the user can be asked to press a predefined remote control button (e.g., the "OK" key) at a time during the commercial.

Thus, in the example above involving the electronics store, when the advertisement for the electronics store is displayed, for instance, the coupon may be offered concurrently (e.g., via an on-screen overlay, as illustrated in FIG. 5, which is further described below), and the user may interact with a user interface and/or provide other user input indicating that the user would like to clip the coupon being offered during the advertisement. Subsequently, in response to receiving the user's request, the service provider may cause the coupon to be "clipped" by associating information about the coupon with information about the user, as further described below.

In step 305 of FIG. 3, account information associated with the user may be identified. For example, in step 305, the service provider (or a coupon application server therein) may identify the user who clipped the coupon, and then retrieve account information associated with the user, such as the user's billing address, account number (e.g., the user's account number with the service provider), payment banking card number (e.g., a credit card number or debit card number used by the user in paying for services provided by the service provider), and/or the like. In the example above involving the electronics store, for instance, the service provider may identify account information by querying a user account database in which account information is stored to determine the number of a credit card used by the user in paying their bills to the service provider. This user account database may include payment history and/or other account-related information, and the user account database may be stored, for example, in application server 107 at central office 103. Other information that may be stored in the user account database may include user preferences, such as user preferences dealing with coupon redemption. For example, a user may specify via user preferences that he or she wishes to redeem coupons by presenting his or her banking card (e.g., a credit card, debit card, etc.) and/or by presenting some other identification, such as a retailer rewards card or a hand-held device (e.g., a mobile telephone, personal digital assistant, an on-screen display thereof, etc.), at participating entities (e.g., businesses, retailers, etc. at which electronically clipped coupons may be redeemed), as further described below.

In step 306, the coupon may be associated with the user's account information. For example, in step 306, the service provider may store data in the user account database indicating that the user clipped the particular coupon. Thus, in the example above involving the electronics store, for instance, the service provider may update the user account database to reflect that the user clipped the coupon to obtain a ten-percent discount on the video game.

In some instances, the service provider also may store information in the user account database indicating at what time and/or date the coupon was clipped, what other content was being displayed (e.g., linear content, on-demand content, television programming, a commercial, etc.), and/or the like. Any and/or all of this information may be used, for instance, by the service provider in generating a coupon profile for the user, which may allow the particular user's likes and dislikes to be determined, recorded, and analyzed, so that additional and/or more relevant coupons may be offered to the particular user in the future. An example coupon profile thus may include, for any particular user, the particular channels or shows for which the user typically clips coupons, the types and/or categories of coupons typically clipped by the user (e.g., hair salon coupons, electronics coupons, etc.), the geographic area for which the user typically clips coupons (e.g., stores located in Northern California), and/or the like. For example, in the example involving the electronics store, after the user clips the coupon to obtain a ten-percent discount on the video game, the service provider may store (in the user's coupon profile) information identifying the channel the user was watching when he or she clipped the coupon, the type of coupon that was clipped (e.g., a video game coupon), and the geographic area in which the electronics store is located (e.g., Mill Valley, Calif.). Subsequently, the service provider may, for instance, offer the user other coupons for products and/or services available at entities located along the user's driving route or in the vicinity of the electronics store, as further described below. Additionally, the service provider may allow the user to filter coupons by category, such that the user could view, for example, all available coupons for haircuts at entities located along the user's driving route from his or her home to the electronics store.

In step 307, the service provider may send a notification to the user indicating that the coupon has been electronically clipped. For example, in step 307, the service provider may send (or cause to be sent) one or more notifications in the form of one or more text messages (e.g., to the user's cellular phone or smartphone), email messages (e.g., to the user's email account), and/or the like, where such notifications indicate that the coupon has been clipped and/or where such notifications include additional information about the coupon, such as the products and/or services to which the coupon may be applied, the locations where the coupon may be redeemed, and/or any other information that the service provider may have about the coupon (e.g., any and/or all of the information that the service provider may store in the user's coupon profile, any and/or all of the information that the service provider may store in the user account database, any and/or all of the information about the coupon that was provided to the service provider by the at least one party, such as in step 301, for instance, etc.).

In step 308, the service provider may monitor or wait for an indication for the user to redeem one or more clipped coupons at a business location (e.g., a retail store). For example, once a user has electronically clipped one or more coupons (e.g., in steps 304, 305, and 306), the user may then visit one or more retail locations to redeem the coupons when purchasing relevant goods and/or services. As further described below, in one example, one or more of the businesses that the user visits may then contact the service provider to determine whether the user has clipped any applicable coupons and/or to determine whether any discounts should be applied to the user's purchases accordingly.

In one or more arrangements, payment account information for each of the users of the service provider may be stored in a user account database. Such payment account information may include, e.g., credit card numbers, debit card numbers, and/or the like used by each of the users in paying for the services provided by the service provider. This configuration may allow the service provider to identify the one or more users who clipped coupons based on their payment account information. Thus, when a user of the service provider wishes to redeem an electronically clipped coupon with a business, the business might only need to provide the service provider with the user's payment account information, as presented to the business at a point of sale terminal, for instance, for the service provider to identify the user (e.g., so that the service provider and/or the business may determine whether the user has any applicable coupons).

For instance, as further described below with respect to FIG. 4, when a user attempts to purchase goods and/or services at a business location, the business's point of sale terminal may contact the service provider, provide the service provider with the user's payment account information (e.g., the user's credit card number or portion thereof) and possibly information about the particular goods and/or services being purchased by the user (so that the service provider may identify the user and determine if the user has clipped any coupons applicable to the particular business, goods, and/or services), and receive a response from the service provider indicating whether the user has any applicable coupons and/or whether any discounts should be applied to the user's purchase. This arrangement may be advantageous because, for example, in a case where a retailer has assigned a unique identifier to the user (e.g., a user rewards program identification number), for instance, the service provider might not know or be able to find out such a number. Rather, by identifying users in the user account database based on their payment information (e.g., the credit card number that the user uses to pay the service provider), or other identification information, such as an account number, the user may be easily identified when using the same payment information at the retailer, for example.

Figure 4:
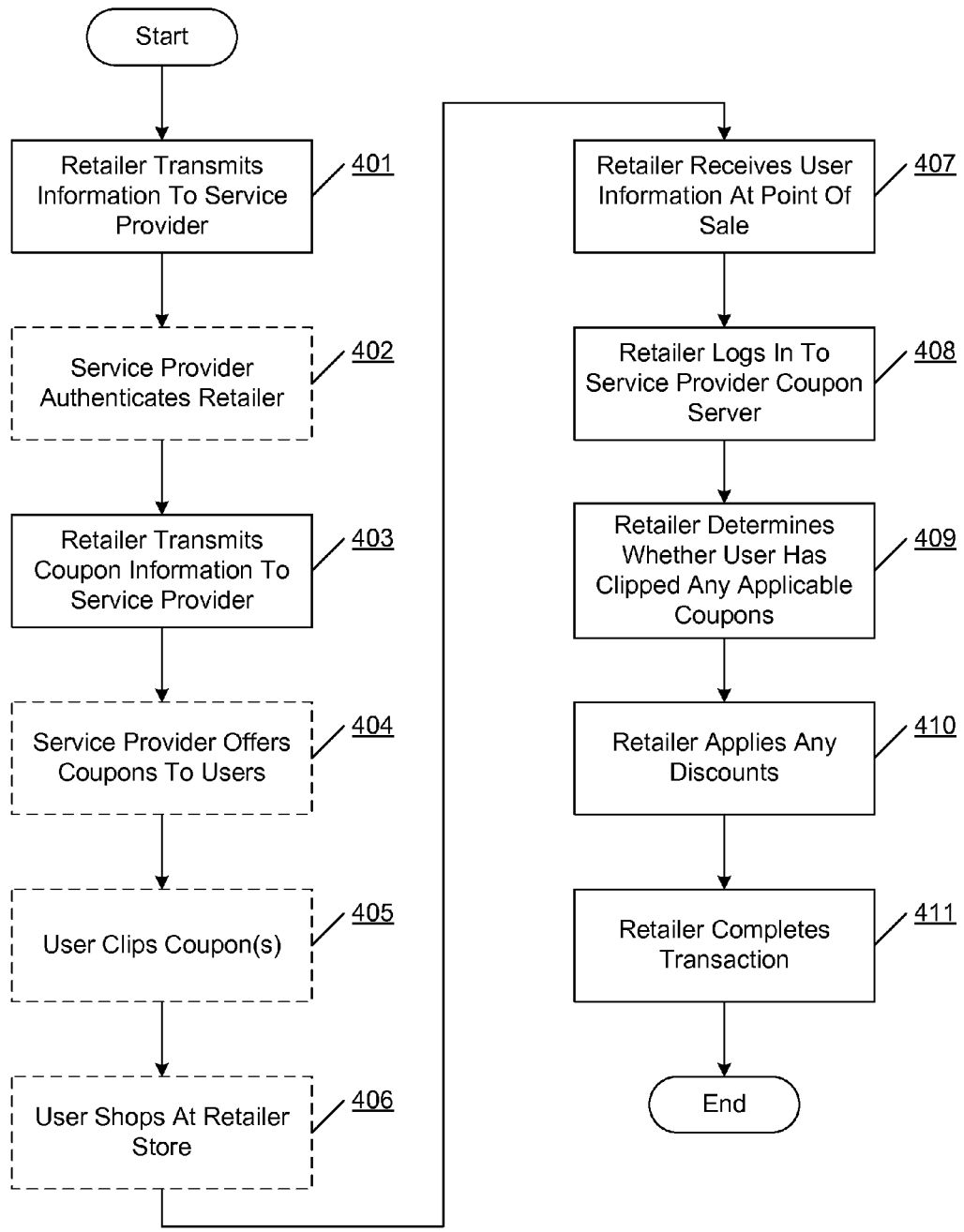
FIG. 4 illustrates an example method of creating, processing, and redeeming electronically clipped coupons according to one or more aspects described herein.

FIG. 4 illustrates an example method of creating, processing, and redeeming electronically clipped coupons according to one or more aspects described herein. In step 401, a business (e.g., an advertiser, retailer, etc.) may login to an application server of, or otherwise access, the service provider. For example, in step 401, a retailer may transmit login information, such as a username and password, to the service provider (e.g., the service provider's computer or server, such as application server 107).

In step 402, the service provider may authenticate the business. For example, the service provider may cross check the login information provided by the retailer to determine whether the retailer is enrolled in an electronic coupon program offered by the service provider and/or to determine whether to allow the retailer to access one or more user interfaces via which the retailer may be able to create and manage coupons to be offered to users of the service provider.

In step 403, the business may transmit coupon information to the service provider. For example, a retailer may transmit coupon information defining one or more new coupons to be offered to users of the service provider, and/or the retailer may transmit coupon information modifying or canceling one or more coupons that were previously created with the service provider. In one or more arrangements, the retailer and the service provider may exchange this information via one or more user interfaces and/or a network, such as via an Internet connection. For instance, the service provider may provide a secure web portal, an application on a wireless device, or other remotely accessible user interface via which one or more businesses may create and edit electronic coupons.

In step 404, the service provider may offer one or more electronically clippable coupons to users, for example, as described above with respect to step 303 of the method illustrated in FIG. 3. In step 405, one or more users of the service provider may electronically clip one or more coupons, for example, as described above with respect to steps 304, 305, and 306 of the method illustrated in FIG. 3.

In step 406, a user may visit (physically or virtually) the business to purchase goods and/or services. For example, a user may shop at a retailer's store, pick out a variety of items for purchasing, and interact with a point of sale terminal to pay for the items (e.g., directly at a self-checkout machine, indirectly via a sales associate employed by the retailer, etc.).

In step 407, the business may receive user information at a point of sale. For example, the retailer may receive user payment information, such as the user's credit card number, at a point of sale terminal (e.g., a cash register, checkout computer, credit card terminal, etc.). Additionally or alternatively, other user information, such as a user's phone number (e.g., a user's home phone number, cellular phone number, etc.), may be received at the point of sale and/or used in identifying the user for purposes of processing electronically clipped coupons and applying any relevant discounts. Other possible user information that may be similarly received and/or used may include a code and/or image displayed by a user device (e.g., a barcode displayed by a pre-registered handheld computing device, such as a cellular phone or personal digital assistant, a key-tag or other device with a chip, etc.).

In step 408, the business may login to an application server of the service provider or otherwise interact with the provider. For example, in step 408, the retailer's point of sale terminal may electronically connect to the service provider's application server (e.g., a server storing and/or accessing information such as user account information, coupon information, etc.). In at least one arrangement, this connection may be made automatically via a secure network connection. In some arrangements, the retailer may login to the service provider's application server manually (e.g., when the retailer's point of sale terminal might not be able to automatically connect to the service provider's application server). For instance, the retailer might not have previously enrolled in an electronic coupon program provided by the service provider, but the user may wish to redeem an electronically clipped manufacturer coupon for a product (e.g., laundry detergent) being purchased from the retailer (e.g., a supermarket). In such a case, the retailer may manually login to the service provider's server (e.g., via a web portal interface), enroll in an electronic coupon program provided by the service provider (e.g., by inputting information such as the retailer's name, address, tax identification number, etc.), and submit information about the electronically clipped coupon that the user wishes to redeem for validation and processing by the service provider (e.g., via the web portal interface).

In step 409, the business may determine whether the user has clipped any applicable coupons. In determining whether the user has clipped any applicable coupons, the business may send a lookup request to the service provider, for instance. Then, the service provider may, for example, identify records associated with the user in one or more databases (e.g., databases storing user account information, coupon information, etc.). In one or more arrangements, the service provider may identify records associated with the user based on the user payment information received by the business at the point of sale (e.g., the user's credit card number or a portion thereof). Subsequently, the service provider may determine, based on these records, whether the user has clipped any coupons that are applicable to the goods and/or services being purchased (e.g., by comparing the coupon information associated with the coupons to information about the goods and/or services being purchased, which may be provided and/or transmitted to the service provider by the business). Thereafter, the service provider inform the business (e.g., via an electronic message) which (if any) coupons are applicable to the user's purchase and/or what discounts (if any) are to be applied.

Alternatively, in some arrangements, when the service provider receives a lookup request from the business, the service provider may identify user records, as described above, and then transmit to the business a list of all coupons clipped by the user (or a subset thereof which are determined by the service provider to be potentially applicable to the particular transaction). Subsequently, the business may determine, based on the list of coupons clipped by the user, whether the user has clipped any coupons that are applicable to the goods and/or services being purchased, and/or whether any discounts are to be applied to the purchase.

In step 410, the business may apply any discounts (e.g., to the goods and/or services being purchased) that are available to the user based on the one or more coupons determined to be applicable in step 409. For example, if the user is purchasing a video game priced at $60 from the retailer, and if it is determined in step 409 that the user previously clipped a 10% off coupon that is applicable to the video game, then the retailer and/or the retailer's point of sale terminal may apply the 10% discount to the purchase price of the video game such that the user will only be charged $54 for the video game.

In step 411, the business may complete the transaction. For example, once the retailer applies any applicable discounts to the price(s) of the goods and/or services being purchased by the user, the retailer may submit the user's credit card information and related transaction information to a credit card processor for authorization and/or otherwise process and complete the transaction. Additionally or alternatively, the business and/or the service provider may update various records and/or databases to record the transaction and/or the use of the one or more applied coupons.

For example, the service provider may update records and/or databases that may be used in generating one or more reports. For instance, the service provider may generate one or more coupon usage reports on a regular basis (e.g., monthly, weekly, etc.) that allow the service provider, various businesses, and/or one or more users to view information about one or more electronic coupons. In at least one arrangement, the one or more reports may be paper or electronic reports that are mailed or otherwise sent to various entities, electronic mail messages and/or web pages that are sent and/or may be viewed when a business or user logs in to a particular web portal using a computer, and/or the like. The following table illustrates an example of a coupon report that the service provider may provide to a business:

| Monthly Coupon Report for Electronics Store A | | |
|---|---|---|
| Coupon ID | Number of Times Clipped | Total Amount Redeemed |
| CA-001 | 10,000 | $5,000 |
| CA-002 | 20,000 | $8,000 |

Similarly, the following table illustrates an example of a coupon report that the service provider may provide to a user:

| Monthly Coupon Report for User B | | |
|---|---|---|
| Number of Coupons Clipped | Total Amount Redeemed | Total Amount Available |
| 5 | $15 | $20 |

In several of the examples described above, one or more coupons may be created by a party different from a content/service provider, such as a retailer or manufacturer. In some arrangements, however, the content/service provider may itself create and offer one or more coupons that are redeemable with a third party (e.g., a third party vendor different from the content/service provider). For example, the service provider may create a coupon that is redeemable with a particular retailer or manufacturer (e.g., a local store, such as a grocery store). Subsequently, the service provider may offer and/or provide this coupon to one or more users if, for instance, such users purchase a particular amount and/or type of content (e.g., pay-per-view content), subscribe to and/or purchase access to particular channels (e.g., premium channels), and/or the like. Thereafter, once a user who clipped this coupon redeems the coupon with the third-party retailer or manufacturer, the service provider may reimburse the retailer or manufacturer for the amount of the coupon (e.g., by paying the retailer or manufacturer the monetary value of the discount that the user received from the retailer or manufacturer when the coupon was redeemed).

FIG. 5 illustrates an example user interface that includes an offer for an electronic coupon according to one or more aspects described herein. In one or more arrangements, any and/or all of the example user interfaces described herein may be implemented in, displayed by, and/or caused to be displayed by a computing device, such as computing device 200, video display 206, or gateway interface device 111.

According to one or more aspects, user interface 500 may include content 501. In one or more arrangements, content 501 may be comprised of a video/audio file, an Internet page, a video-on-demand file, and/or other multimedia content. In at least one arrangement, content 501 may include an advertisement or other notice informing a viewer of goods and/or services manufactured and/or sold by one or more particular entities. For instance, content 501 may include an advertisement for a video game available at an electronics store, as may be seen in the example user interface illustrated in FIG. 5.

Additionally or alternatively, user interface 500 may include a prompt 502 that offers an electronic coupon to a user. The prompt 502 may inform a user of the availability of an electronic coupon, such as an electronic coupon for goods or services currently being advertised or presented in content 501. Additionally or alternatively, prompt 502 may prompt a user to clip the electronic coupon being offered, e.g., by requesting the user to provide user input if the user is interested in clipping the coupon. While the example prompt 502 illustrated in FIG. 5 includes text, such a prompt also may include images, video, and/or other interactive audiovisual content (e.g., one or more buttons or hyperlinks). As described above, by clipping an electronic coupon, the user may cause the coupon to be associated with the user's account information in one or more databases, or a particular database solely for storing coupon information, which then may enable the user to later redeem the coupon by presenting identifying information (e.g., matching payment account information) at the particular retailer.

Figure 6:
FIG. 6 illustrates an example user interface that includes a notification message regarding an electronically clipped coupon according to one or more aspects described herein.

FIG. 6 illustrates an example user interface that includes a notification message regarding an electronically clipped coupon according to one or more aspects described herein. According to one or more aspects, a computing device, such as computing device 200 or gateway interface device 111, may display (or cause to be displayed) user interface 600 after a user has clipped an electronic coupon previously offered to the user. For example, if a user pressed "OK" in response to electronic coupon offered by prompt 502 of FIG. 5 being displayed, the computing device may display user interface 600 of FIG. 6.

In one or more arrangements, user interface 600 may include a notification message 601. Notification message 601 may, for example, inform a user that an electronic coupon has been clipped. Additionally or alternatively, notification message 601 may provide instructions to the user regarding how the electronic coupon may be redeemed. According to one or more aspects of the disclosure, and as discussed above, a user may be able to redeem a coupon electronically at a retailer simply by presenting a banking card (e.g., a credit card, a debit card, etc.) at the point of sale, and thus, the instructions included in notification message 601 may so inform a user.

Figure 7:
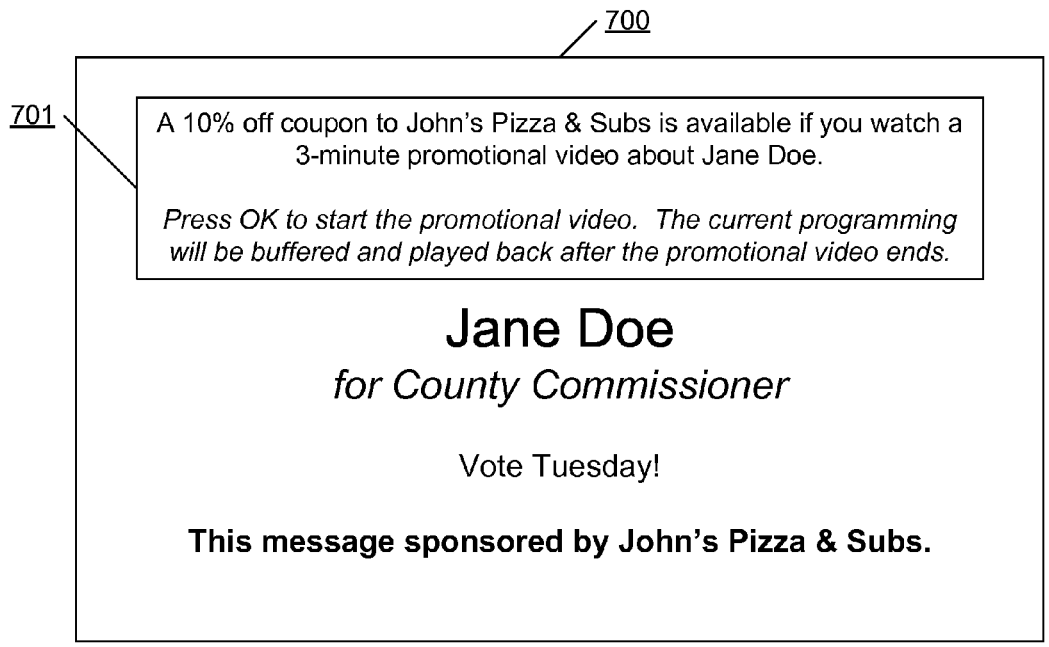
FIG. 7 illustrates an example user interface that includes an offer for an electronic coupon according to one or more aspects described herein.

FIG. 7 illustrates an example user interface that includes an offer for an electronic coupon according to one or more aspects described herein. As further described below, in some instances, it may be desirable to ask a user to perform some action (e.g., viewing a promotional video) before allowing the user to clip a particular coupon, as this may further enhance the advertising value of participating in an electronic coupon program. According to one or more aspects, user interface 700 may include prompt 701 that offers an electronic coupon to a user. The electronic coupon offered by prompt 701 may differ from electronic coupon offered by prompt 502 of FIG. 5 in that prompt 701 may prompt the user to perform some action before a corresponding electronic coupon may be clipped. For example, prompt 502 may ask a user to take a survey, make a charitable donation, watch a promotional video, and/or the like. This prompt (e.g., prompt 701) may be displayed to a user by the user's device (e.g., gateway 111), for instance, when the content items and associated coupons are distributed in step 303 above. In some arrangements, prompt 701 might only comprise a graphic, symbol, or icon (instead of a text box) that indicates that a coupon is available for clipping. A user may, for instance, be able to configure his or her device (e.g., gateway 111) to display such an icon in place of a text box when a coupon offer is available (e.g., by modifying settings in a corresponding user profile as desired), and/or the service provider may configure coupon offers to be displayed in this manner.

Additionally or alternatively, in situations where accepting the electronic coupon offered by prompt 701 may distract or prevent the user from viewing content (e.g., because accepting the electronic coupon offered by prompt 701 may involve viewing other content, such as a promotional video or survey form), a computing device displaying user interface 700 (e.g., a handheld device such as a smartphone, computing device 200, gateway interface 111, etc.) may buffer the content and subsequently may allow the user to play back such content after accepting the electronic coupon offered by prompt 701 (e.g., after play back of the promotional video has finished, after the survey is complete, etc.).

Figure 8:
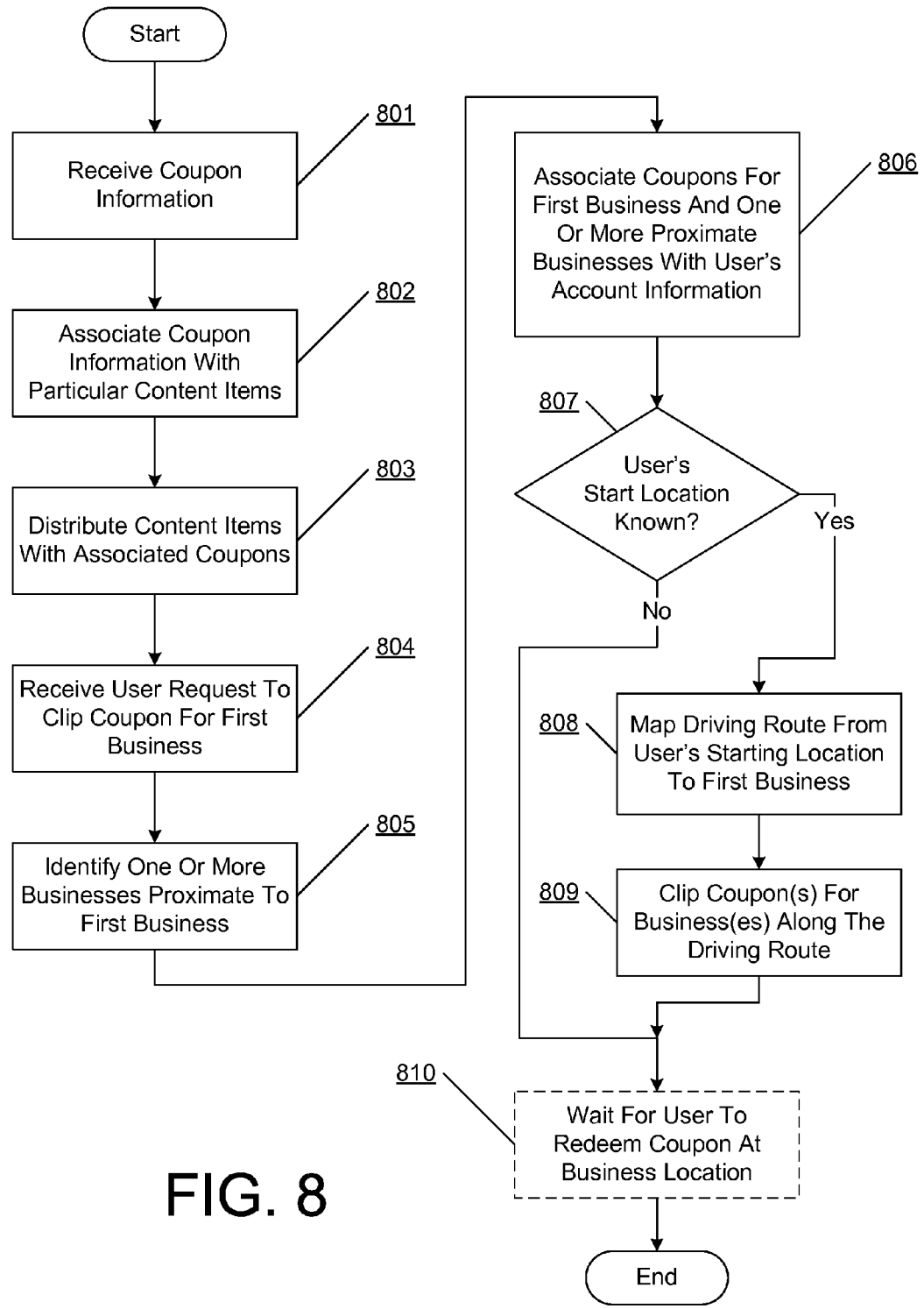
FIG. 8 illustrates an example method of automatically clipping electronic coupons according to one or more aspects described herein.

FIG. 8 illustrates an example method of automatically clipping electronic coupons according to one or more aspects described herein. In step 801, information about one or more coupons may be received from at least one business or any advertiser. For instance, in step 801, a service provider may receive coupon information from a retailer, as, for example, in step 301 (described above with respect to FIG. 3). For example, the coupon information may be received electronically at central office 103 (e.g., by application server 107) from a computing device associated with the retailer. In one or more arrangements, the coupon information received in step 801 also may include location information, which may indicate where the one or more coupons defined by the coupon information may be redeemed and/or in which geographical regions such coupons should be offered. Such location information thus may include, for instance, one or more street addresses of retail locations where the coupons may be redeemed, as well as cities, neighborhoods, and/or postal codes in which the coupons are to be offered.

For example, the service provider may receive coupon information from a home improvement store, and the coupon information may define a coupon that can be redeemed at the home improvement store to obtain a ten-percent discount on power tools sold by the home improvement store. The coupon information may also specify when and/or where the coupon is to be displayed. In addition, the coupon information may include one or more street addresses corresponding to one or more retail locations of the home improvement store where the coupon can be redeemed.

In step 802, the coupon information may be associated with one or more particular content items. For instance, as similar to step 302 (described above with respect to FIG. 3), having received the coupon information from the retailer, the service provider may associate one or more particular coupons having associated coupon information with one or more particular content items (e.g., television shows, advertisements, applications etc.).

For example, with reference to the example above involving the home improvement store, the coupon information may specify that the coupon should be offered concurrently with commercials for the home improvement store. Accordingly, one or more devices at central office 103 (e.g., application server 107) may, for instance, update a database where programming configuration details are stored so that when commercials for the home improvement store are transmitted, the home improvement store's coupon is offered. In addition, the programming configuration details may be updated to reflect the geographic regions (e.g., states, cities, towns, postal codes, neighborhoods, etc.) in which the coupon or coupons are to be offered. In addition, the content provider may associate coupons with networks or channels that may be related to the coupon information.

In step 803, the content items may be distributed with the associated coupons. For example, as in step 303, the service provider may transmit the content items (e.g., from central office 103 to various homes 102 via the network of lines 101) to a plurality of users. With reference to the example above involving the home improvement store, the service provider thus may transmit linear television content, for instance, and when a commercial for the home improvement store is transmitted and/or displayed, the service provider may cause the coupon for the home improvement store to be offered to the viewers receiving the linear television content, as described above. In addition, the information transmitted to the users that includes the coupon for the home improvement store also may include one or more addresses of retail locations of the home improvement store where the coupon may be redeemed after it is clipped by a user.

In step 804, a user request to clip a coupon for a first business or product, for example, may be received. For example, as similar to step 304 (which was described above with respect to FIG. 3), the user's request to clip the coupon may be received at a device at the user's location (e.g., gateway 111), which then may relay the request to a device at a location of the service provider (e.g., central office 103 and/or application server 107).

Figure 9:
FIG. 9 illustrates an example user interface that includes an offer for an electronic coupon according to one or more aspects described herein.

For instance, in the example above involving the home improvement store, the coupon may be offered concurrently with the displaying of the advertisement for the home improvement store (e.g., via an on-screen overlay, as illustrated in FIG. 9, which is further described below), and the user may interact with a user interface and/or provide other user input indicating that the user would like to clip the ten-percent-off coupon being offered during the advertisement. Prior to clipping the home improvement store's coupon in this example, however, the service provider may automatically select and clip another coupon for a different business proximate to the home improvement store, as further described below.

In particular, in step 805 of FIG. 8, one or more businesses proximate to the first business may be identified. In identifying such proximate businesses, a computing device associated with the service provider (e.g., central office 103, application server 107, etc.) may first, for example, determine at which retail location(s) the first coupon may be redeemed. This determination may be based on the location information included in the coupon information, as described above. Subsequently, the computing device may search electronic map information to identify one or more other businesses that are near the first business (e.g., within one mile, within five miles, etc.) for which electronic coupons are available (e.g., by cross-referencing the coupon information received from the businesses in step 801). If the computing device is unable to identify any other businesses within a certain range of the first business (e.g., within one mile), the computing device may expand the range in which the computing device is searching for other businesses (e.g., from one mile to five miles) and repeat the search for other nearby businesses. In addition, this expanding of the range and searching for other businesses may be repeated if the search at the expanded range is again unsuccessful in identifying nearby businesses (e.g., expanding the search from five miles to ten miles, and so on).

For instance, in the example above involving the home improvement store, application server 107 may determine that a barbershop called "Tony's Barbershop" is located near the home improvement store (e.g., because the barbershop is located within three miles of the home improvement store where the first coupon may be redeemed). Accordingly, application server 107 may identify the barbershop as a business proximate to the home improvement store. Of course, proximity could be configured to be any desired amount of distance, and in some arrangements, the definition of proximity may vary depending on the geographic location of the first business. For example, if the first business is located in an urban area, proximity may be defined as a relatively shorter distance (e.g., half a mile) than if the first business were located in a rural area (where proximity may be defined as, for instance, five miles). Additionally or alternatively, proximity may be specified by the user according to a user preference and/or specified by the service provider according to a default setting and/or the like.

In step 806, the service provider's computing device (e.g., central office 103, application server 107, etc.) may associate the coupons for the first business and the one or more other businesses that were identified as proximate to the first business with the user's account information. According to one or more aspects, this may involve identifying user account information and storing coupon data as described above with respect to steps 305 and 306. Thus, if the barbershop is determined to be near the home improvement store in the example above, for instance, the service provider may update the user account database to reflect that the coupon for the home improvement store and the coupon for the barbershop are available to the user for redemption at each respective establishment. If additional businesses were identified and additional coupons were accordingly clipped, then the coupon information for those additional coupons may too be updated in the user account database. In addition, at this point, the service provider's computing device may cause a message to be displayed to the user (e.g., via the user's computing device) to inform the user that these one or more additional coupons were clipped for proximate businesses.

In some arrangements, if the user's route to the first business is known (e.g., if the user's starting location is known), it may be desirable to provide the user with additional coupons that may be redeemed at businesses along the user's route. While the service provider might know the user's home address and thus might be able to assume that the user's route to the first business will take the user from their home address to the address of the first business, it might not always be the case that the user will travel to the first business from their home. For instance, the user may travel to the first business from another location (e.g., another retail establishment).

Thus, in step 807, it may be determined whether the user's starting location is known. In some arrangements, the service provider's computing device (e.g., central office 103, application server 107, etc.) simply may assume that the user's starting location is their home address on record with the service provider. In these arrangements, the method may proceed directly to step 808. In other arrangements, the service provider's computing device may determine whether the user's starting location is known by causing a prompt to be displayed to the user (e.g., via the user's computing device and/or display device, such as gateway 111, television 112, etc.) when the user requests to clip the coupon for the first business. Such a prompt may ask the user whether the user plans to travel to the first business from their home location (which may be known to the service provider, as described above) or from another location. In at least one arrangement, if the user indicates that they plan to travel to the first business from another location, an additional prompt may be displayed to ask the user where they will be traveling from (e.g., the name of another retail establishment from which the user will begin their journey, another street address, a city and state, and/or the like).

If it is determined that the user plans to travel to the first business from their known home location or from another known location (e.g., based on the response to the prompt(s) received by central office 103, application server 107, etc.), then the method may proceed to step 808. On the other hand, if it is determined (e.g., by the service provider's computing device) that the user's starting location is not known, then the method may proceed to step 810.

In step 808, the service provider's computing device (e.g., central office 103, application server 107, etc.) may map a driving route from the user's starting location to the first business. In one or more arrangements, the service provider's computing device may perform this mapping by accessing commercially available map data and/or mapping software.

Subsequently, in step 809, the service provider's computing device (e.g., central office 103, application server 107, etc.) may clip one or more coupons for one or more businesses determined to be along the mapped driving route. This clipping may involve, for instance, identifying one or more businesses along the mapped driving route (as similar to the identifying of proximate businesses in step 805 above) and associating the one or more coupons for these businesses with the user's account information (as similar to the associating of coupons in step 806 above). In at least one additional arrangement, the service provider's computing device also may cause a message to be displayed to a user (e.g., via the user's computing device, such as gateway 111, television 112, etc.) to inform the user that these one or more additional coupons were clipped. In one or more additional arrangements, the service provider also may display one or more user interfaces that allow the user to browse available coupons within a user-specified distance from the location(s) associated with any of the clipped coupons.

For example, in the example above involving the home improvement store and the barbershop, application server 107 may map a driving route from the user's home to the home improvement store. Having mapped the driving route, application server 107 then may identify a clothing store located along the driving route for which the service provider is able to distribute a coupon (which may, for instance, include an offer to receive ten percent off items of a particular brand). Accordingly, application server 107 may automatically associate the coupon for the clothing store with the user's account, so that the user may later redeem that coupon at the clothing store. By automatically clipping coupons in this way, the service provider may be able to offer retailers (such as the clothing store in this example) new ways of reaching potential users.

In step 810, the service provider may wait for the user to redeem one or more clipped coupons at a business location (e.g., a retail store), as similar to step 308 of the method described above with respect to FIG. 3.

FIG. 9 illustrates an example user interface that includes an offer for an electronic coupon according to one or more aspects described herein. Like user interface 500 of FIG. 5 (described above), user interface 900 of FIG. 9 may include content 901, which may, for instance, include an advertisement for power tools that are available for purchase at a home improvement store, as seen in the example user interface illustrated in FIG. 9. Additionally or alternatively, and again like user interface 500, user interface 900 may include a prompt 902, which may inform a user of the availability of an electronic coupon and/or prompt the user to clip the coupon being offered.

Figure 10:
FIG. 10 illustrates an example user interface that includes a notification message regarding an automatically clipped electronic coupon according to one or more aspects described herein.

FIG. 10 illustrates an example user interface that includes a notification message regarding an automatically clipped electronic coupon according to one or more aspects described herein. According to one or more aspects, a computing device, such as computing device 200 or gateway interface device 111, may display (or cause to be displayed) user interface 1000 after a user has clipped an electronic coupon offered to the user and/or after a system implementing one or more aspects of the disclosure has automatically clipped an electronic coupon for the user. For example, if a user pressed "OK" in response to prompt 902 of FIG. 9 being displayed, the computing device may display user interface 1000 of FIG. 10 after one or more steps of the example method of automatically clipping electronic coupons illustrated in FIG. 8 have been performed.

In one or more arrangements, user interface 1000 may include a notification message 1001. Notification message 1001 may, for example, inform a user that the electronic coupon corresponding to prompt 902 has been clipped and/or that another electronic coupon has also been clipped automatically. For instance, after a user clips the coupon for the home improvement store offered by prompt 902, the system may automatically clip a coupon for a nearby barbershop for the user (e.g., as described above), and notification message 1001 may inform the user that the coupon for the barbershop has been clipped. Additionally or alternatively, notification message 1001 may display the address of the barbershop to the user, provide additional information about the coupon (e.g., the type of discount available, other terms of the offer, etc.), and/or the like.

In one or more additional arrangements, notification message 1001 might also include (or only include) a graphic, symbol, or icon that may indicate that one or more electronic coupons have also been clipped automatically, as well as the number of coupons that was clipped automatically. Notification message 1001 may also inform the user that the user may access a coupon profile user interface to view the clipped coupon(s) and/or arrange a driving route between the various locations. Additionally or alternatively, notification message 1001 may include a user-selectable link or other control that allows the user to access such a user interface.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
receiving, at a central computing device, a request from a user to electronically clip a displayed first coupon associated with a first party;
responsive to the request to electronically clip the displayed first coupon, identifying a second party proximate to the first party based on the location from the first party and electronically clipping a second coupon associated with a second party; and
associating the displayed first coupon and the second coupon with account information related to a user device.

2. The method of claim 1, further comprising:
prior to receiving the user request, displaying, via the user device, the displayed first coupon, wherein the displayed first coupon is related to content currently displayed via the user device.

3. The method of claim 1, wherein the electronically clipping the displayed first coupon to allow the displayed first coupon to be redeemed at a location associated with the first party upon presentation of the account information.

4. The method of claim 1, further comprising configuring the displayed first coupon to be available for electronic clipping by the user after the user consumes at least a part of a particular content item associated with the displayed first coupon.

5. The method of claim 1, wherein the associating the displayed first coupon and the second coupon with the account information comprises associating the displayed first coupon and the second coupon with the account information related to a permissibility of the user device to access content comprising linear television programming.

6. The method of claim 1, further comprising:
transmitting content to the user device; and
configuring the displayed first coupon to trigger the user device to buffer the content while the displayed first coupon interrupts the content.

7. The method of claim 1, further comprising:
configuring the displayed first coupon to be modifiable in appearance by the user device according to a user profile.

8. The method of claim 1, wherein identifying the second party comprises:
searching an electronic map to identify other businesses within a first predetermined distance from the first party;
determining whether any other businesses were identified within the first predetermined distance; and
searching the electronic map to identify other businesses within a second predetermined distance when no other businesses were identified within the first predetermined distance.

9. The method of claim 1, further comprising:
responsive to electronically clipping the displayed first coupon, storing, in a backend system, information identifying the displayed first coupon in association with payment account information of the user such that the displayed first coupon is redeemable when the backend system receives the payment account information from the first party in response to receipt of the payment account information from the user.

10. The method of claim 1, further comprising:
receiving, from the first party, payment account information provided by the user to obtain goods or services from the first party;
using the received payment account information to identify matching payment account information that is used to pay a service provider to provide content for the user; and
determining whether the matching payment account information is associated with information indicating that the displayed first coupon has been electronically clipped.

11. The method of claim 1, further comprising:
determining a start location of the user;
mapping a route from the start location of the user to the first party based on first location information of the first party; and
electronically clipping one or more additional coupons for one or more additional parties along the route.

12. The method of claim 11, wherein determining the start location of the user comprises determining an address included within the account information.

13. The method of claim 11, further comprising causing a message to be displayed to the user to inform the user that the one or more additional coupons have been clipped.

14. A method, comprising:
receiving, by a content provider device, a request from a user to electronically clip a displayed first coupon associated with a first business located at a first location;
electronically clipping the displayed first coupon in response to the request;
using location information of the first business to identify a second business located proximate to the first business;
electronically clipping a second coupon associated with the second business;
receiving an inquiry, from the first business or the second business, inquiring whether the user has clipped any coupons; and
transmitting, to at least one of the first business and the second business, information related to the displayed first coupon or the second coupon in response to receiving the inquiry.

15. The method of claim 14, further comprising:
identifying account information related to the user after receiving the request from the user; and
associating the displayed first coupon and the second coupon with the account information upon electronically clipping the displayed first coupon and the second coupon.

16. The method of claim 15, further comprising:
identifying one or more additional businesses located proximate to the first business; and
electronically clipping one or more additional coupons associated with the one or more additional businesses different from the first business and the second business.

17. The method of claim 15, further comprising configuring the account information when the user is given permission to access content of a content provider.

18. The method of claim 14, further comprising determining a location of the user based on network configuration information.

19. The method of claim 14, wherein using location information of the first business to identify the second business located proximate to the first business comprises:
mapping a travel route from a location of the user to the first business; and
identifying a business located along the travel route as the second business.

20. The method of claim 14, further comprising configuring
the displayed first coupon to be displayed to the user concurrently with linear television programming.

21. A method, comprising:
receiving, from a first party, information related to a first electronic coupon associated with content;
transmitting the content to a user device;
receiving, at a content provider device from the user device, a request to electronically clip the first electronic coupon displayed on a display device;
receiving location information specifying one or more locations at which the first electronic coupon is redeemable;
using the location information to identify one or more second parties for which one or more second electronic coupons are redeemable;
storing, by the content provider device, information related to the first electronic coupon and the one or more second electronic coupons in association with account information of the user device; and
receiving a request to redeem at least one coupon from among the first electronic coupon and the one or more second electronic coupons.

22. The method of claim 21, further comprising clipping the first electronic coupon in response to a selection by the user via the user device to which the content provider transmits the content.

23. The method of claim 21, further comprising making the first electronic coupon available to the user after the user consumes at least a part of the content.

24. The method of claim 21, wherein using the location information to identify the one or more second parties for which the one or more second electronic coupons are redeemable comprises:
identifying a set of parties that are proximately located within a predetermined range from the one or more locations; and
determining whether one or more parties of the set of parties are associated with any electronic coupons.

25. The method of claim 21, wherein using the location information to identify the one or more second parties for which the one or more second electronic coupons are redeemable comprises:
mapping a route from a location of the user to at least one of the one or more locations at which the first electronic coupon is redeemable; and
identifying the one or more second parties as having locations along the route.

26. The method of claim 21, wherein transmitting the content comprises transmitting an advertisement.

27. The method of claim 21, further comprising redeeming the at least one coupon in response to receiving the request to redeem the at least one coupon.

28. The method of claim 27, wherein redeeming the at least one coupon comprises:
determining that the first electronic coupon or at least one of the one or more second electronic coupons has been clipped for a user; and
transmitting data indicating that the user has clipped the first electronic coupon or at least one of the one or more second electronic coupons.

* * * * *

UNITED STATES PATENT AND TRADEMARK OFFICE
CERTIFICATE OF CORRECTION

| | | |
|---|---|---|
| PATENT NO. | : 8,914,821 B2 | Page 1 of 1 |
| APPLICATION NO. | : 13/187865 | |
| DATED | : December 16, 2014 | |
| INVENTOR(S) | : Jianju Liu | |

It is certified that error appears in the above-identified patent and that said Letters Patent is hereby corrected as shown below:

In the Claims

Column 19, Line 27:
    In Claim 1, please delete "the location from" and insert --a location of--

Column 19, Line 29:
    In Claim 1, before "second party," delete "a" and insert --the--

Column 19, Line 33:
    In Claim 2, before "request," delete "user"

Column 19, Line 35:
    In Claim 2, delete "currently" and insert --concurrently--

Column 19, Line 37:
    In Claim 3, delete "wherein the" and insert --further comprising--

Column 19, Line 46:
    In Claim 5, after "wherein" delete "the"

Signed and Sealed this
Fifteenth Day of September, 2015

Michelle K. Lee
*Director of the United States Patent and Trademark Office*